Oct. 16, 1934.  C. STECHER  1,976,860
SEALING COMPOUND APPLYING MACHINE
Filed Oct. 26, 1931  6 Sheets-Sheet 1

INVENTOR.
CHARLES STECHER
BY Albert C. Bell
ATTORNEY.

Oct. 16, 1934.  C. STECHER  1,976,860
SEALING COMPOUND APPLYING MACHINE
Filed Oct. 26, 1931  6 Sheets-Sheet 2

INVENTOR.
CHARLES STECHER
BY Albert C. Bell
ATTORNEY.

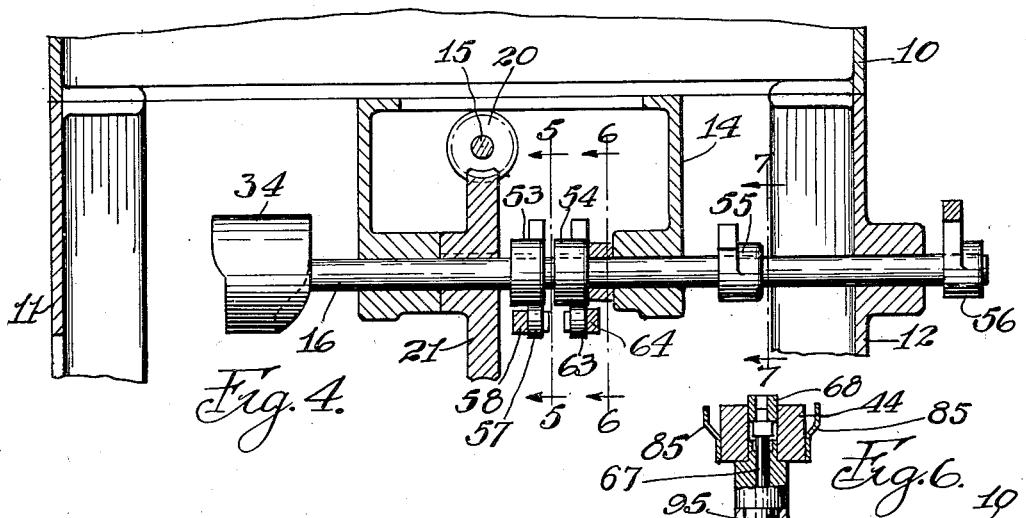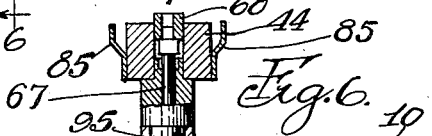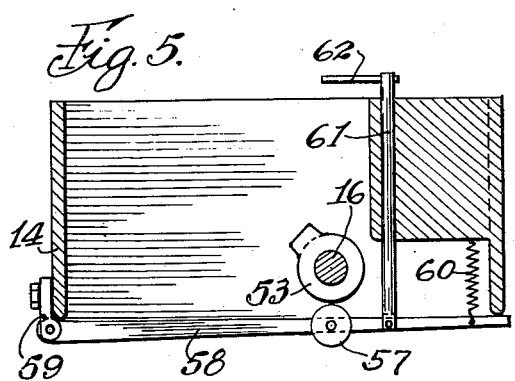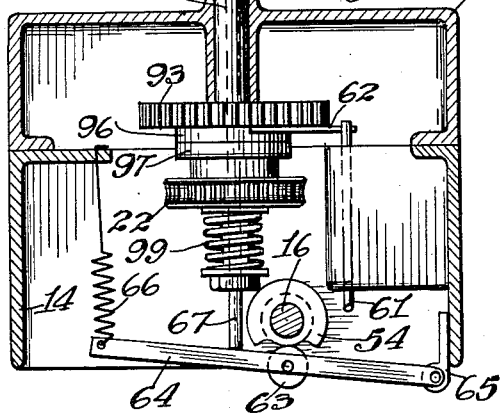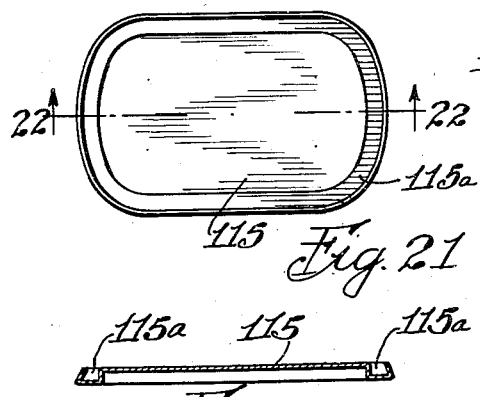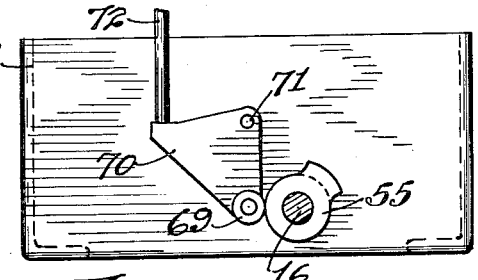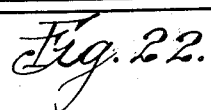

Oct. 16, 1934.　　　　　　C. STECHER　　　　　1,976,860
SEALING COMPOUND APPLYING MACHINE
Filed Oct. 26, 1931　　6 Sheets-Sheet 4
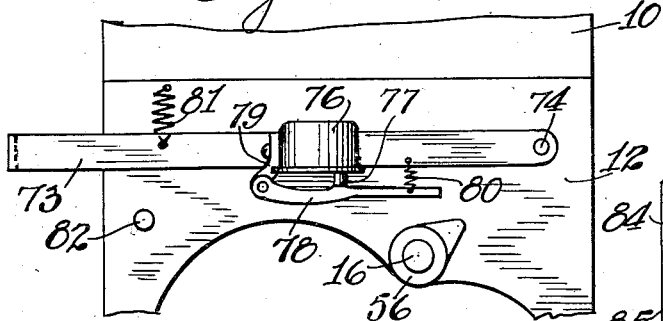
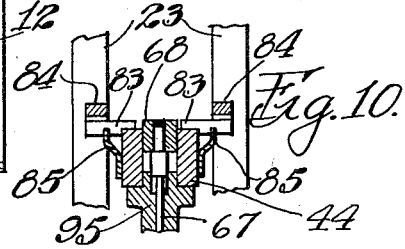
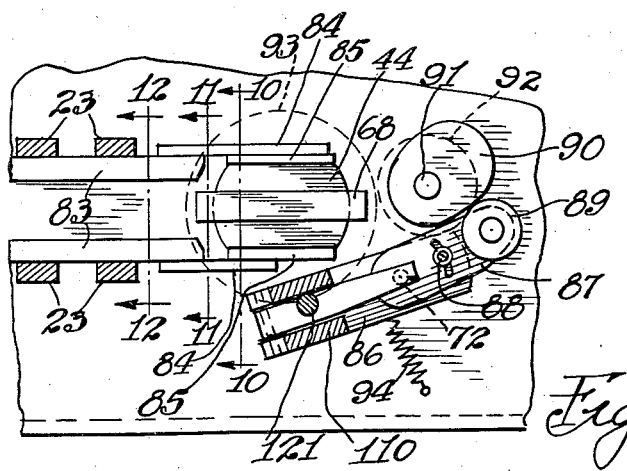
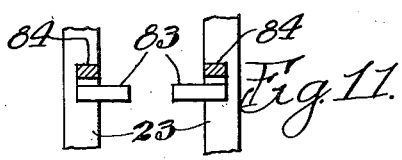
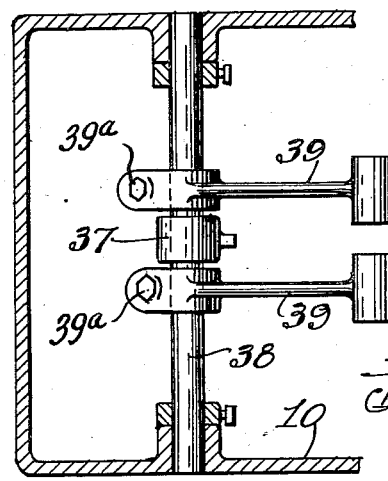
INVENTOR.
CHARLES STECHER
BY Albert C. Bell
ATTORNEY.

Oct. 16, 1934.      C. STECHER      1,976,860
SEALING COMPOUND APPLYING MACHINE
Filed Oct. 26, 1931      6 Sheets-Sheet 5
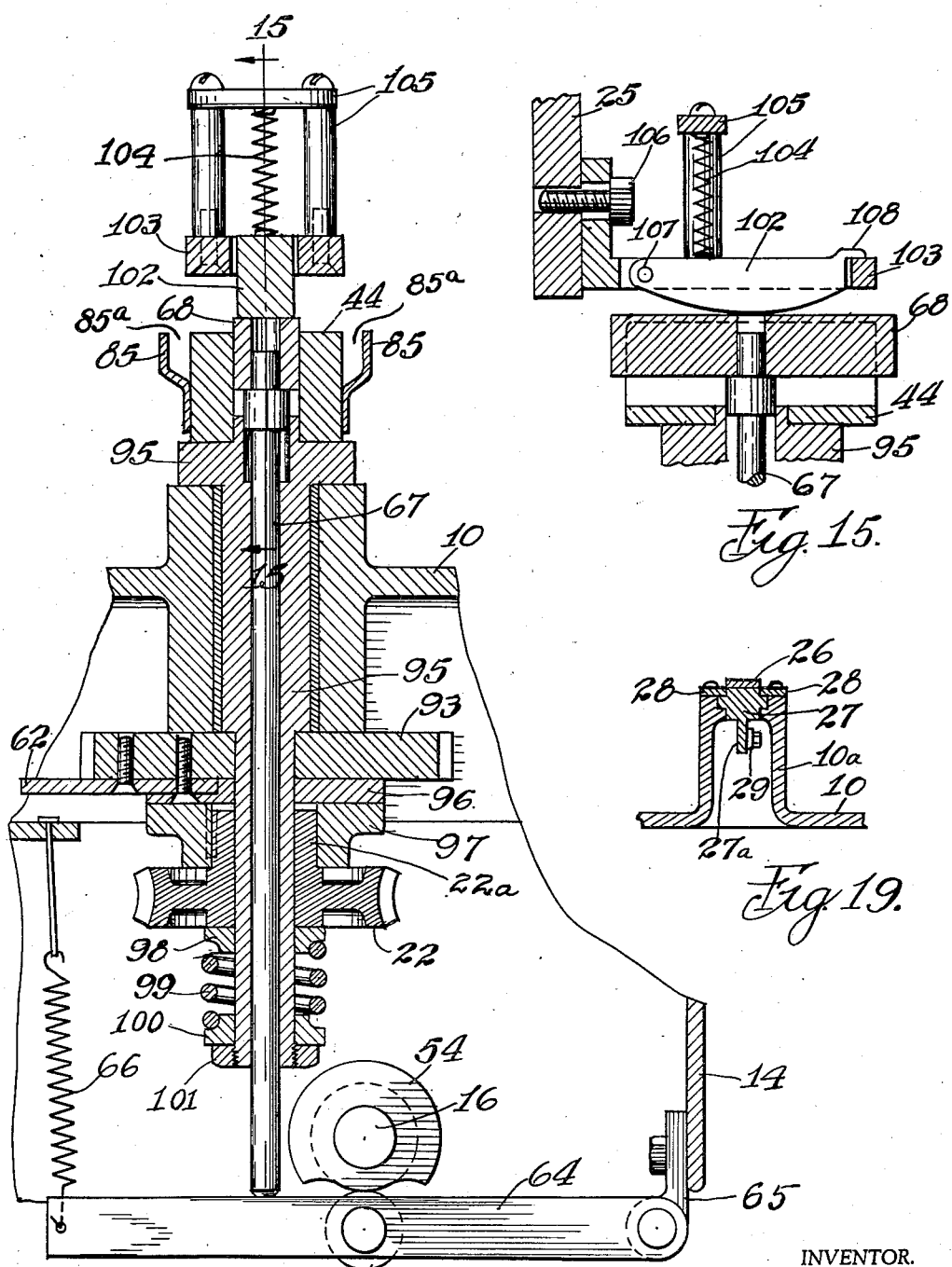
INVENTOR.
CHARLES STECHER
BY Albert C. Bell
ATTORNEY.

Oct. 16, 1934.  C. STECHER  1,976,860
SEALING COMPOUND APPLYING MACHINE
Filed Oct. 26, 1931  6 Sheets-Sheet 6

INVENTOR.
CHARLES STECHER
BY Albert C. Bell
ATTORNEY.

Patented Oct. 16, 1934

1,976,860

UNITED STATES PATENT OFFICE 1,976,860

SEALING COMPOUND APPLYING MACHINE

Charles Stecher, Chicago, Ill.

Application October 26, 1931, Serial No. 571,012

24 Claims. (Cl. 113—80)

My invention relates to an improved machine for applying sealing compound to parts of metal cans before seaming the parts of the can together, so that the lock seams subsequently made between the parts of the can, will be fluid tight. While lock seams usually employed to hold the parts of sheet metal cans together, are tight enough for many purposes, without the use of sealing compound, in some cases it is required that the joints shall be fluid tight, even against fluids which by their nature may be penetrating. By my machine, I provide a construction by which formed sheet metal blanks, which later become parts of the completed cans, and having recesses or grooves along their edges, are supplied with a sealing compound of plastic nature, for example a rubber compound, as a result of which, when the edge portion of the adjacent part of the can is placed in the recess or groove, and the parts are secured together by folding the edges of the parts over each other, the sealing compound is pressed between the folded edge portions of the can, and insures the making of a fluid tight joint between the parts.

In my machine, devices are provided for automatically feeding the blanks from a stack thereof, one at a time to a chuck which is thereupon rotated to apply the sealing compound around the entire edge portion of the blank, suitable nozzle mechanism for the sealing compound being held in alignment with the edge portion of the blank during its rotation, by cam mechanism, and other devices being provided for raising the nozzle mechanism and interrupting the flow of compound from the nozzle and then ejecting the blank from the chuck and delivering it from the machine, at the same time that the next blank is fed to the chuck. In this manner, the machine is automatic in operation and requires only that the supply of blanks shall be maintained, in order to insure the rapid application of the sealing compound to the blanks one after another. My improved machine also provides means for electrically controlling the operation of the machine so that when it is necessary to stop the machine for any reason, all of its parts will be in a position corresponding to the beginning of a cycle of operation of the machine, when the machine comes to rest.

The above and other objects of my invention will more fully appear from the description of the drawings, illustrating a preferred embodiment of my machine, as follows.

Figure 1:
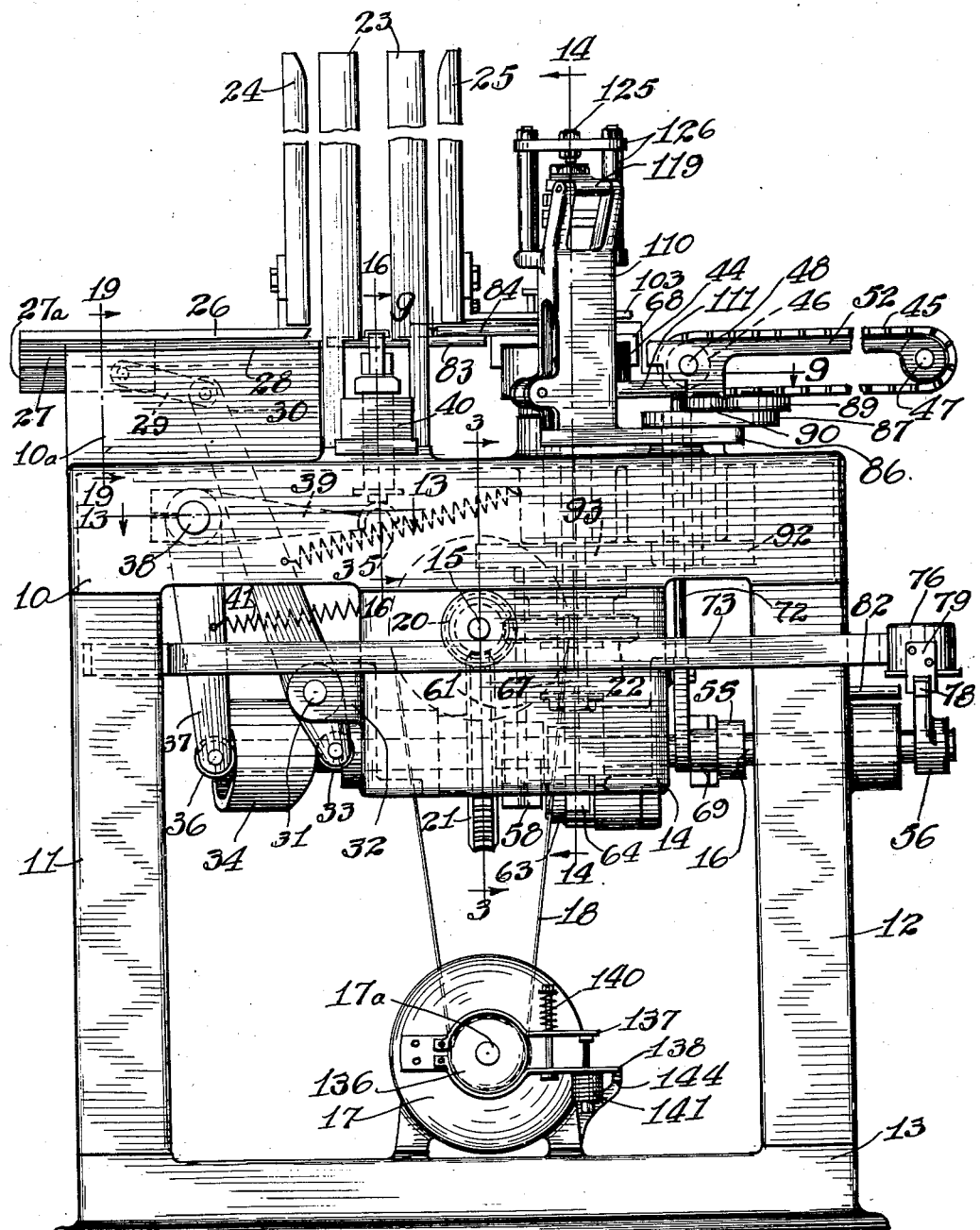
Fig. 1 shows in front elevation the complete machine.
Figures 2, 3:
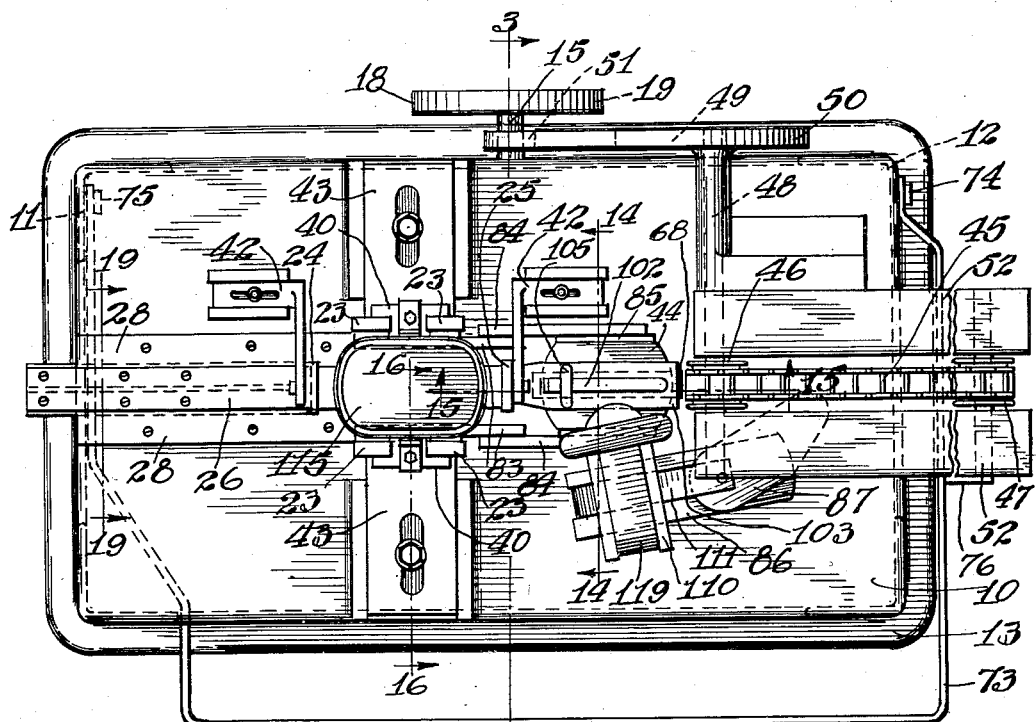
Fig. 2 is a plan view of the machine shown in Fig. 1.
Figure 16:
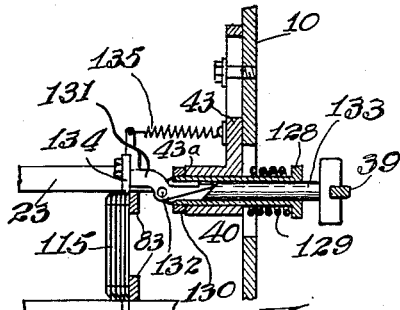
Figure 17:
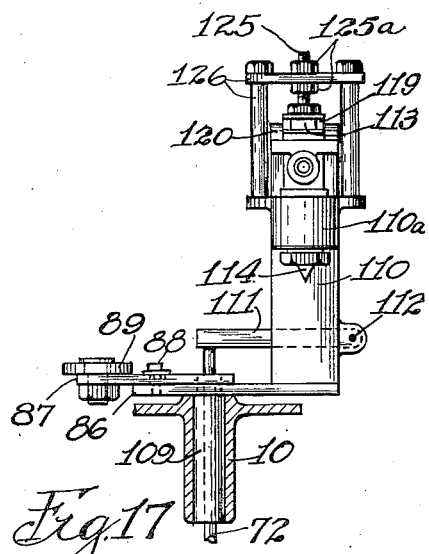
Figure 20:
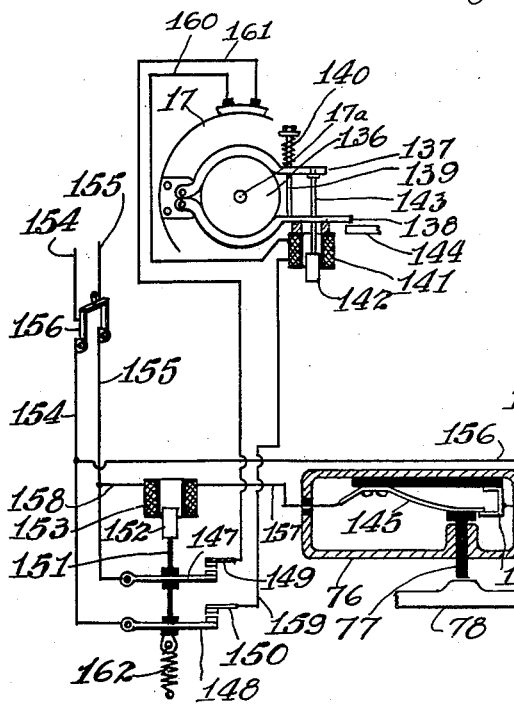
Figure 18:
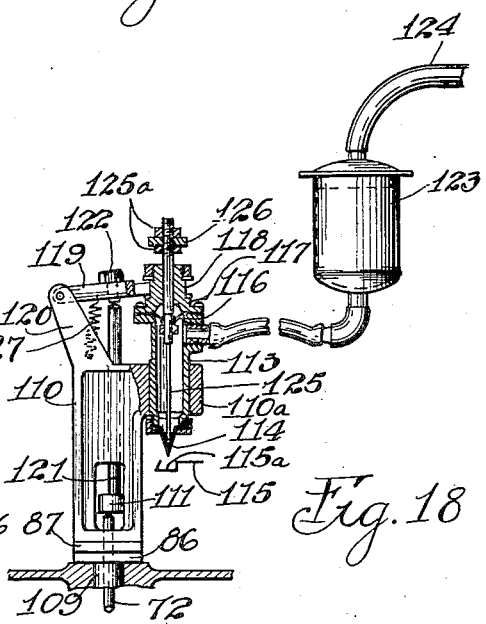

Fig. 3 is a vertical sectional view of the machine taken along the line 3—3 in Figs. 1 and 2, Fig. 4 is a vertical sectional view through the main cam shaft of the machine, this view being taken along the line 4—4 in Fig. 3, Figs. 5, 6 and 7 are vertical sectional views of the construction shown in Fig. 4 taken respectively along the lines 5—5, 6—6 and 7—7 in that figure, Fig. 8 is a view showing in right hand side elevation, the lower part of the machine shown in Fig. 1, Fig. 9 is a horizontal, sectional view of a part of the construction shown in Fig. 1, taken along the line 9—9 in that figure, Figs. 10, 11 and 12 are vertical sectional views of the construction shown in Fig. 9 taken respectively along the lines 10—10, 11—11 and 12—12 in that figure, Fig. 13 is a horizontal, sectional view of a part of the construction shown in Fig. 1 taken along the line 13—13 in that figure, Fig. 14 is a vertical, sectional view to an enlarged scale through the axis of the chuck mechnism, this view being taken along the line 14—14 in Figs. 1 and 2, Fig. 15 is a vertical, sectional view to an enlarged scale of a part of the construction shown in Figs. 2 and 14, this view being taken along the line 15—15 in said figures, Fig. 16 is a vertical, sectional view to an enlarged scale of a part of the construction shown in Figs. 1 and 2, this view being taken along the line 16—16 in said figures, Fig. 17 shows to an enlarged scale in rear elevation, the nozzle mechanism and its support, Fig. 18 is a side elevation of the parts shown in Fig. 17, showing the nozzle mechanism in vertical, central, sectional view, Fig. 19 shows in vertical, sectional view a part of the construction shown in Figs. 1 and 2, this view being taken along the line 19—19 in said figures, Fig. 20 is a diagrammatic view illustrating the electric circuits and devices employed for controlling the operation of the machine, Fig. 21 illustrates in plan view and to an enlarged scale, a blank adapted to have the sealing compound supplied to it, for the adjustment and relation of parts illustrated in Figs. 1 and 2, and Fig. 22 is a longitudinal, central, sectional view of the blank shown in Fig. 21, taken along the line 22—22 in that figure.

Similar numerals refer to similar parts throughout the several views.

My machine illustrated in Fig. 1 consists of a bed portion 10, leg sections 11 and 12, and a base portion 13. The bed portion 10 has secured to its lower portion and extending downwardly therefrom, a housing 14 for supporting the shafts 15 and 16 of the machine. The base 13 supports an electric motor 17 provided to drive the shaft 15 by a belt 18, as more clearly indicated in Figs. 2 and 3, in which figures, a pulley 19 is indicated as secured to the rear end of the shaft 15, for engagement by the upper portion of the belt 18. As illustrated in Figs. 1 and 3, the shaft 15 has rigidly secured thereto, a worm 20 meshing with a worm wheel 21 rigidly secured to the shaft 16, and meshing also with a second worm wheel 22 mounted on the chuck spindle to rotate the chuck. The wheel 21 is preferably of somewhat larger pitch diameter than the wheel 22, so that the chuck spindle may be given a complete rotation during the time that the shaft 16 is making but part of a rotation, to the end that cams carried by the shaft 16 may control the feeding and blank ejecting operations of the machine in a manner to be described.

As shown in Figs. 1 and 2, vertical bars 23, 24, and 25 are supported by the bed 10 to hold a stack of blanks to be operated upon by the machine, and a feeding bar 26 is disposed horizontally in line with the lowermost blank of said stack, said feeding bar being carried by a feeding head 27, which as more clearly shown in Fig. 19, is supported for longitudinal movement in a slot formed through an upper extension 10a of the bed 10. As illustrated in Fig. 19, the head 27 is recessed along its edges to fit the corresponding shaped edges of the slot in the bed extension 10a, to support the head for longitudinal sliding movement, the head being held in position in said slot by gibs 28, 28 secured to the upper surface of the bed extension 10a. The head 27 is provided with a flange portion 27a extending downwardly into the bed extension 10a to which is pivotally connected one end of a link 29, the other end of which link, as shown in Fig. 1, is pivotally connected with the upper end of a lever 30, pivotally mounted at 31 on a bracket 32 extending from the housing 14, the lower end of said lever having mounted thereon a roller 33 engaging one end cam surface of a cam 34 rigidly secured to the shaft 16. As a result of this construction, rotation of the shaft 16 oscillates the lever 30 and reciprocates the feeding bar 26 to move the lowermost one of the blanks from its position at the bottom of the stack of blanks referred to, over the chuck of the machine and in position to have the sealing compound applied to it. A spring 35 is secured to the lever 30 and to the bed 10, to hold the roller 33 against the cam 34, so that the action of the spring serves to move the feeding bar 26 to feed the lowermost blank from below the stack of blanks, when the angular position of the cam 34 permits such movement. In this manner, if for any reason there should be an accidental jamming of the blanks, no damage will be done, which might readily occur if the feeding operation were the result of positive cam action. The other end of the cam 34 is provided with a second cam surface engaged by a roller 36 carried by the lower end of an arm 37 secured to a shaft 38 supported in bearings carried by the bed 10. The shaft 38 also has secured thereto, as more clearly shown in Fig. 13, additional arms 39 extending under lifting mechanisms 40 disposed on opposite sides of the stack of blanks, to lift the stack of blanks somewhat above the lowermost blank of the stack, leaving the latter free to be moved without restraint, by the feeding bar 26 when the latter is operated. The lifting operation referred to, occurs when the arms 39 move upwardly as permitted by the corresponding cam surface of the cam 34. A spring 41 is secured to the arm 37 and to the housing 14, to hold the roller 36 against the corresponding cam surface of the cam 34, and to move the arms 39 upwardly when the angular position of the cam 34 permits such operation. The arms 39 are preferably secured to the shaft 38 by clamping screws 39a as indicated in Fig. 13, to permit their adjustment on the shaft as required for different blanks, and the outer ends of said arms are preferably of substantial width to permit adjustment of the lifting mechanisms for blanks of different size without changing the location of the arms 39 on the shaft 38.

As shown in Fig. 2, the bars 24 and 25 are supported from the bed 10, by slotted brackets 42, 42 so that the bars may be given different adjustments for different size blanks. Each pair of bars 23 is supported by a corresponding one of the lifting mechanisms 40, each of which mechanisms is provided with a slotted supporting bracket 43 permitting different adjustments of the bars 23, 23 for different size blanks.

As illustrated in Fig. 2, a chuck 44 is supported by the bed 10 in horizontal position and in alignment with the feeding bar 26 and with the stack of blanks, to receive blanks moved over it by the feeding bar. A conveyer 45, preferably of the chain type, is mounted on grooved rollers 46, 47 in line with the chuck 44 and the feeding bar 26, to receive a blank from the chuck 44 when the next blank is fed to the chuck by the feeding bar. The roller 46 is secured to a shaft 48 supported in suitable bearings carried by the bed 10, a pulley 49 being also secured to the shaft 48 for engagement with a belt 50 driven by a pulley 51 carried by the shaft 15. The conveyer 45 is preferably provided with side bars 52, 52 to insure proper handling of the blanks by the conveyer, which side bars are supported by the bed 10 and in turn support bearings for the roller 47.

As shown in Fig. 4, the shaft 16 also has secured to it, cams 53, 54, 55 and 56. As shown in Fig. 5, the cam 53 has resting upon it, a roller 57 carried by a lever 58 pivotally supported by a bracket 59 carried by the housing 14, the roller 57 being held against the cam by a spring 60 extending between the lever 58 and a part of said housing. The lever 58 is pivotally connected with a rod 61 extending vertically and upwardly from the lever, through a guide carried by the housing 14 to engage a stop arm 62 of the chuck rotating mechanism, when the lever 58 is in its uppermost position, so that the cycle of angular movement of the chuck may be limited to one rotation in a manner to be described, although this amount of angular movement is but part of a complete cycle of operation of the cams carried by the shaft 16. As shown in Fig. 6, the cam 54 is engaged by a roller 63 carried by a lever 64 pivotally supported at one end on a bracket 65 secured to the housing 14, the other end of the lever being engaged by a spring 66 connected also with the housing 14, to hold the roller 63 against said cam. A rod 67 rests at its lower end on the lever 64, in which position it is held in a manner to be described. The rod 67 extends axially through the chuck spindle and at its upper end engages the ejector bar 68 of the chuck 44, so that upward movement of the lever 64 raises the ejector bar to remove from the chuck, a blank that has been supplied with sealing compound while on the chuck. As shown in Fig. 7, the cam 55 has resting against it, a roller 69 carried by a bell crank lever 70 which is pivotally supported at 71 on a wall of the housing 14, the other arm of the bell crank lever being engaged by the lower end of a vertical rod 72 held downwardly upon it in a manner to be described, as a result of which, operation of the bell crank lever 70 by the cam 55, lifts the rod 72, which lifting movement as will be described, raises the nozzle mechanism to clear a blank about to be removed from the chuck 44 after supplying said blank with sealing compound.

As shown in Figs. 1 and 2, a bent bar 73 extends across the front of the machine, its bent ends being pivotally connected with the leg sections 11 and 12 at 74 and 75, to form a controlling member for the machine. The bar 73, as shown in Fig. 8, carries an electric switch 76 from the lower surface of which, a push button 77 extends, said button being held in its outer position by a spring in a manner to be described, so that when the button is in its outermost position, the operating circuits of the motor driving mechanism are closed and the machine is in operation unless otherwise stopped, and that when the button 77 is pressed upwardly, the operating circuits of the machine driving mechanism are open and operation of the machine stops. A lever 78 is pivotally supported at one end by a bracket 79 carried by the switch 76, and said lever extends under the button 77 against which it is held by a light spring 80 but with insufficient pressure to push the button 77 upwardly. The free end of the lever 78 extends over the cam 56, so that engagement between the cam and the lever will push the button 77 upwardly and stop the machine. This occurs however, only when the lever 78 is in its lowermost position, and the bar 73 is normally held in an upper position by a spring 81 extending between the bar and the leg section 12, so that as long as the machine is operating satisfactorily, there is no engagement between the cam 56 and the lever 78. When for any reason it is desired to stop the machine, the bar 73 is depressed against a stop pin 82 carried by the leg section 12, which brings the free end of the lever 78 into the path of the operating portion of the cam 56. The cam 56 is so disposed angularly on the shaft 16, that when its operating portion engages the lever 78 to press the button 77 upwardly, the other parts of the machine are in their positions corresponding to the beginning of a cycle of operation of the machine.

As shown in Fig. 9, the chuck 44 is in line with horizontal supporting bars 83 secured to the vertical bars 23, with their upper surfaces substantially in the plane of the upper surface of the ejector bar 68, when the latter is in its raised position, the bars 83 serving to support the stack of blanks when the blank lifting mechanism does not engage the blanks, and to support the lowermost one of the stack of blanks when the rest of the blanks are raised by the lifting mechanism, so that said lowermost blank may be moved onto the ejector bar 68 by operation of the feeding bar 26. The bars 83 carry at their outer ends guide bars 84 above the upper surfaces of the bars 83, to hold a blank fed onto the ejector bar 68, in alignment with the chuck 44, so that the blank will properly engage the chuck when the ejector bar is moved downwardly. As more clearly shown in Fig. 10, the lower surfaces of the bars 84 are sufficiently above the upper surface of the chuck 44, to clear the blank when it is rotated with the chuck in applying the sealing compound. To further insure proper engagement of the blank with the chuck 44 when the ejector bar 68 is moved downwardly, bent plates 85 are secured to the side portions of the chuck 44, forming grooves 85a along the upper edges of the sides of the chuck as illustrated in Fig. 14, to receive the corresponding edge portions of the blank. The relation of the bars 83 and 84 to each other and to the bars 23 is shown in Figs. 10, 11 and 12.

As shown in Fig. 9, a plate 86 is mounted to move in a horizontal plane around the axis of the rod 72 in a manner to be described, and said plate carries a second plate 87 movable thereon about the axis of the rod 72 for adjustment purposes and arranged to be held in desired adjustment on the plate 86 by a clamping screw 88. The plate 87 carries a roller 89 engaging a cam 90 carried by a short vertical shaft 91 mounted for rotation in a bearing carried by the bed 10, the lower end of the shaft having rigidly secured thereto a gear 92 meshing with a gear 93 carried by the spindle of the chuck 44. A spring 94 extending between the plate 86 and the bed 10, holds the roller 89 against the cam 90. As a result of the construction described, the nozzle carried by the plate 86 for applying compound to the blank, is moved laterally by the cam 90 so that it is in registry with the edge portion of the blank as the latter rotates during the compound applying operation. Where, as is the case with the illustrative blank below described, the end portions of the blank are alike, the gears 93 and 92 may have a two to one ratio, and the cam 90 is shaped to properly position the nozzle laterally at any instant for either end portion of the blank, so that two rotations of the cam 90 are required to complete the cycle of applying the compound to the blank. For other shapes of blanks, other gear ratios may be used to advantage and the cam 90 is correspondingly shaped, depending upon the particular form of blanks to be handled by the machine in any particular case.

As shown in Fig. 14, the chuck 44 is carried by the upper end of a vertical spindle 95 supported in a suitable bearing carried by the bed 10, the spindle being bored to receive the rod 67 which carries at its upper end, the ejector bar 68 as indicated. Below its bearing, the spindle 95 has rigidly secured to it the gear 93, to the lower surface of which the stop arm 62 is secured as indicated. Below the gear 93, the spindle has secured to it a first friction disk 96 engaged by the upper surface of a second friction disk 97 secured to a sleeve 22a extending upwardly from the gear 22. Below the gear 22, the spindle 95 carries a collar 98 forming a seat for the upper end of a compression spring 99, the lower end of which is seated on a second collar 100 held on the spindle 95 by a nut 101 screwed on the lower end of said spindle. The gear 22 is free to move on the spindle 95 excepting for the friction between the disks 96 and 97 and the frictional engagement of the collars 98 and 100 with the gear 22 and the nut 101 respectively, the amount of this friction being determined by the degree to which the spring 99 is compressed. As a result of this construction, when the gear 22 is rotated, the chuck 44 is also rotated until the stop arm 62 engages the stop rod 61 above described, after which the gear 22 may continue to rotate without imparting turning movement to the chuck 44. The ejector bar 68 and the chuck 44 may readily be removed from the rod 67 and spindle 95 respectively, and replaced by other ejector bars and chucks, to handle blanks of different sizes and shapes, as desired.

As also shown in Fig. 14, the ejector bar 68 has mounted above it, a pressure bar 102 carried by a frame 103 and held downwardly towards the ejector bar 68 by a compression spring 104 resting at one end against the pressure bar and at its other end against a yoke 105 carried by the frame 103. As more clearly shown in Fig. 15, the frame 103 is secured to the lower end of the vertical bar 25 by a screw 106, the corresponding portion of the frame 103 being slotted to permit vertical adjustment of the frame relatively to the bar 25, depending upon the thickness of blanks handled by the machine at any particular time. The pressure bar 102 is pivotally connected with the frame 103 at one of its ends as shown at 107, and at its other end it is provided with a lip 108 extending over the frame to limit downward movement of the pressure bar under the action of the spring 104. When a blank is fed onto the ejector bar 68, said ejector bar is in its raised position and in moving the blank upon the ejector bar, the pressure bar 102 is raised against the action of the spring 104, the feeding movement serving to move the blank longitudinally into registry with the chuck 44. When subsequently and before turning movement of the chuck 44 begins, the ejector bar 68 is lowered, the pressure bar 102 moves the blank downwardly so that its edge portion engages the edge of the chuck, in which position the blank is retained during rotation of the chuck and until the blank is removed from the chuck by raising the ejector bar 68 against the action of the spring 104.

As shown in Fig. 17, the plate 86 is rigidly secured to the upper end of a vertical sleeve 109 which is supported for oscillatory movement in a bearing carried by the bed 10, the plate 87 being oscillatory about the upper end of the sleeve 109 for adjustment purposes as above described. The plate 86 carries a vertical standard 110 having parallel side walls between which a lever 111 is mounted in substantially horizontal position, so that one of its ends rests upon the upper end of the rod 72, the other end of said lever being pivotally connected with the standard as shown at 112. As more clearly shown in Fig. 18, the standard 110 is provided at its upper end with an offset arm 110a which supports in vertical position, a tubular member 113 provided at its lower end with a nozzle 114, having a discharge aperture in alignment with the grooved edge portion 115a of a blank 115 on the chuck 44 as a result of the action of the cam 90 above described. The blank 115 is more clearly shown in Figs. 21 and 22.

The upper end of the tubular member 113 is closed by a flexible diaphragm 116 held in place by a cap 117, which cap is extended upwardly and provided with a circumferential groove 118 to receive the forked ends of a lifting lever 119 pivotally mounted on arms 120 extending upwardly from the standard 110. The lever 111 has resting upon it, a rod 121 extending with a sliding fit upwardly through a suitable bore therefor in the standard 110, so that its upper end is somewhat below the lever 119, which lever carries a screw 122, the lower end of which is in engagement with the upper end of the rod 121 to adjust the operation of the lever 119 by vertical movement of the said rod 121. As a result of this construction, the tubular member 113, which is free to move vertically in the extension 110a, is raised and lowered by upward and downward movement respectively of the rod 72 by the operation of the cam 55 above described, so that the nozzle may be in its upper position to clear the blank when a blank is being removed from the chuck and another blank is placed in position thereon, and that the nozzle may be closely adjacent the grooved portion of the blank when the compound is being supplied from the nozzle to the blank.

The tubular member 113 is connected at its upper portion by suitable pipe connections as indicated, with a tank 123 containing fluid sealing compound to be applied to the blanks, for example a compound of rubber in fluid condition, the contents of the tank 123 being preferably under pressure, for example by communicating compressed air to the tank by a pipe 124, or in any other convenient manner, to insure proper flow of sealing compound from the nozzle 114 during the rotation of the blank by the chuck 44 to apply the compound to the blank.

The tubular member 113 has mounted therein, and preferably centrally thereof, a needle valve rod 125, which valve rod extends through the diaphragm 116 between retaining members on said valve rod on opposite sides of the diaphragm, said valve rod being continued through the cap 117 with a sliding fit, and having its upper end rigidly secured by suitable nuts 125a threaded on the valve rod, to a yoke 126 carried by the extension 110a. In this manner, the needle valve 125 is given a fixed position vertically, and is preferably so adjusted by the nuts 125a, that when the nozzle 114 is raised by the rod 72 at the end of an operation applying the sealing compound to a blank, the lower end of the needle valve is pressed tightly against the inner surface of the nozzle to stop the flow of sealing compound from the nozzle. This condition is assured when the machine is stopped by depressing the button 77, due to the adjustment of the cam 56, to the end that sealing compound will not flow from the nozzle when the machine is stopped. When the nozzle is again lowered to apply the sealing compound to the next blank, the discharge opening in the nozzle is open and free flow of the compound through the nozzle is permitted. A spring 127 extending between the lever 119 and the standard 110 holds the lever 119 downwardly against the rod 121 and this in turn holds the rod 72 downwardly, so that the roller 69 shown in Fig. 7, is held against the cam 55.

As shown in Fig. 16, each of the lifting mechanisms 40 consists of a vertically movable tubular member 128, mounted with a sliding fit in a boss 43a extending upwardly from the corresponding supporting bracket 43. The tube 128 is flanged at its lower end to engage the lower end of a compression spring 129 mounted around the tube so that its upper end engages the lower surface of the supporting bracket 43. The upper end portion of the tube 128 is threaded to engage a nut 130 by which the tube is held in the bracket against the action of the spring 129. The upper end of the tube 128, above the nut 130, is slotted to receive a lever 131 which is supported upon a pivot rod 132 carried by the upper end portion of the tube 128. The lower end of the lever 131 extends downwardly into the tube 128 and into engagement with the oblique upper end of a rod 133 contained in the tube 128 with a sliding fit, the lower end of the rod 133 resting upon the outer end portion of one of the arms 39 above described. The lever 131 at its upper end, is offset and carries at its upper end a sharp edged tooth member 134, so that movement of the lever on its pivot rod, moves the tooth towards and between adjacent ones of the blanks 115, or away from said blanks as the case may be. A spring 135 is connected with the lever 131 and the supporting bracket 43, in a manner tending to move the tooth member 134 away from the blanks 115. The parts just described are so related that with the arm 39 in its lower position, the rod 133 is in its lowermost position, permitting the spring 135 to move the tooth member 134 away from the blanks sufficiently so that the end of the tooth clears the edge portion of the blanks, for which condition, the blanks may drop upon the supporting bars 83, 83. Before the feeding bar 26 is operated, the arms 39 are raised and the first part of this movement raises each of the rods 133 and moves the corresponding tooth member 134 between the lowermost blank and the blank next above it, for which condition the lever is against the side wall of the tube 128 as far as it will go, and continued upward movement of the arms 39, raises the tooth members 134 and the blanks above them, against the action of the springs 129, leaving the lowermost blank 115 on the supporting bars 83 and in a condition to be freely moved by the feeding bar 26 over the ejector bar 68. When the feeding bar is nearly or quite in its fully retracted position, the arms 39 move downwardly, which first lowers the stack of blanks 115, and when the blanks are lowered as far as the downward movement of the tubes 128 will permit, the rods 133 continue their downward movement and the springs 135 move the tooth members 134 from engagement with the blanks, permitting the stack of blanks to drop substantially the height of one blank, upon the supporting bars 83, 83.

As shown in Fig. 20, I illustrate diagrammatically a form of mechanism that may be employed to control the operation of the motor 17. As illustrated in this figure, the shaft 17a of the motor, carries a drum 136 engaged by brake shoes 137 and 138 so connected by a rod 139 and a spring 140, that they are pressed against the drum unless the action of the spring 140 is overcome. The brake shoe 138 carries a releasing solenoid 141, the plunger 142 of which acts through rod 143 to move the shoe 137 away from the shoe 138, when the solenoid is energized. The outer end of the shoe 138 preferably engages a fixed stop 144 in its released condition, to insure that both of the shoes shall clear the drum when the solenoid is energized. The switch box 76 above described, may contain a contact spring 145 engaging the button 77, to hold it in its outermost position, in which position it is arranged to engage a fixed contact 146. A control switch consisting of switch arms 147 and 148 may be employed to control the connection of the motor 17 with its energizing circuit, which switch arms may make contact with fixed contacts 149 and 150 respectively to close the operating circuit of the motor. The switch arms 147 and 148 are connected by a rod 151 of insulating material, which in turn is connected with the core 152 of a solenoid 153, so that when the solenoid 153 is energized, the core 152 and rod 151 will be moved to in turn move the switch arms 147 and 148 into engagement with the contacts 149 and 150, respectively. Main supply conductors are illustrated at 154 and 155, the circuit connections being as follows: main conductor 154, wire 156, contact 146, spring contact 145, wire 157, solenoid 153, wire 158 to main conductor 155. This circuit energizes the solenoid 153 when the button 77 is in its outer position, to close the motor operating circuit. The main conductor 154 is also connected with switch arm 148, the contact 150 of which is connected by wire 159 with solenoid 141, the other terminal of which is connected by wire 160 with one terminal of the motor circuits, the other terminal of which is connected by wire 161 with contact 149, the switch arm 147 being connected with the other main conductor 155. As a result of these connections, when the button 77 is depressed, the solenoid 153 is deenergized and the switch arms 147 and 148 are moved from engagement with the contacts 149 and 150 respectively by the action of a spring 162 connected with the rod 151. This opens the circuit through the motor windings and also through the solenoid 141, permitting the spring 140 to press the brake shoes 137 and 138 against the drum 136. The energization of the solenoid 141 by energization of the solenoid 153, when the button 77 is released, separates the brake shoes 137 and 138 and permits rotation of the motor armature. When it is desired to stop the motor, the button 77 is depressed as above described, the solenoid 153 is deenergized, and this separates the switch arms 147 and 148 from their contacts 149 and 150 respectively, opening the motor circuit and at the same time permitting the spring 140 to immediately stop rotation of the motor, thus insuring that the parts of the machine will remain in desired position when the cam 56 above described, depresses the button 77. A main switch 156 is illustrated in the main conductors 154 and 155, to disconnect the motor when it is not to be operated for any considerable time.

While the cams 34, 53, 54, 55, 56 and 90 are diagrammatically shown in the drawings, it will be understood that they are properly shaped and related to each other to effect the following cycle of operation. Beginning for example, with the instant when the feeding bar 26 has moved one of the blanks 115 over the chuck 44, which moves the preceding blank from the ejector bar 68 onto the conveyor 45, the cam 54 immediately depresses the lever 64 and permits the pressure bar 102 to force the blank and ejector bar downwardly so that the blank is in engagement with and seated upon the chuck 44. At the same time, the cam 55 releases the roller 69 and permits the rod 72 to move downwardly under the action of the spring 127, which is communicated to the rod 72 through the rod 121 and lever 111, this action being aided by the pressure on the sealing compound in the tube 113, so that the nozzle 114 follows the blank 115 downwardly and continues its downward movement until the end of the nozzle is in discharging position relatively to the groove 115a in the blank. Immediately upon the blank 115 being properly seated on the chuck 44, the cam 53 depresses the lever 58 to in turn move the rod 61 downwardly from engagement with the stop arm 62. This frees the chuck spindle 95, which at once moves angularly by the frictional engagement of the disks 96 and 97. The rotation of the chuck 44 is accompanied by rotation of the cam 90 through the gears 93 and 92, so that the nozzle 114 is maintained in registry with the groove 115a in the blank 115, and since downward movement of the nozzle 114 separates it from the needle valve 125, the sealing compound is delivered from the nozzle during angular movement of the chuck 44, which continues until the chuck has made one rotation. Before the chuck 44 has completed one rotation, the cam 53 releases the lever 58 so that under the action of the spring 60, the stop rod 61 is moved upwardly into the path of the stop bar 62, and this stops the angular movement of the chuck 44 when it has made just one rotation, and it also stops the angular movement of the cam 90 when it has completed the angular movement required to maintain the nozzle 114 in registry with the groove 115a throughout the entire length of the groove 115a. At the same time that the stop bar 62 engages the stop rod 61, the cams 54 and 55 engage the rollers 63 and 69 respectively, to quickly raise the rods 67 and 72 respectively, thereby lifting the blank which has been supplied with sealing compound, from the chuck 44, and at the same time lifting the nozzle 114 to clear the blank 115 in its raised position. As pointed out above, the shaft 16 is turned through but part of one rotation, to effect one rotation of the chuck 44, and in the remaining part of the rotation of the shaft 16, before the rods 61 and 72 are again moved downwardly, the right hand cam surface of the cam 34 permits the spring 35 to move the lever 30 to correspondingly move the feeding bar 26 to push the lowermost blank 115 from beneath the stack of blanks, onto the ejector bar 68 and over the chuck 44, which operation is completed before the end of the single rotation of the shaft 16 under consideration. After feeding the blank over the chuck 44 as described, the feeding bar 26 is retracted by the cam 34 to its position of rest just to the left of the stack of blanks, in which position it remains while the next blank is dropped in front of it. While the feeding bar 26 is in its retracted position, the cam 34 operates the lever 37 to depress the arms 39, 39 which in turn moves the tooth members 134 downwardly to release the stack of blanks, so that they rest on the supporting bars 83, 83, which is promptly followed by releasing the lever 37 so that the spring 41 will move the arms 39, 39 upwardly with the result that the tooth members, in the manner above described, move around the edge of the lowermost blank, then inwardly into engagement with the blank above the lowermost blank, and then upwardly to raise all of the stack of blanks except the lowermost one, a sufficient amount to permit the lowermost blank to be moved freely by the feeding bar 26 towards the chuck 44. While a part of the operation of the feeding bar 26 and the tooth members 134, 134, referred to, may be effected during rotary movement of the chuck 44, it is desirable that the feeding bar 26 shall be in its fully retracted position before the operation of the tooth members 134, 134 to release the lowermost one of the stack of blanks, and the releasing and freeing of the lowermost one of the stack of blanks should be completed before feeding movement of the feeding bar 26. At the same time that the feeding bar 26 is in its fully retracted position, and the tooth members 134, 134 have freed the bottom one of the stack of blanks, preliminary to the next cycle of operation, the cam 56 is preferably in angular position to operate the switch button 77 by means of the lever 78, to open the operating circuit of the motor 17 as above described, provided the controlling member 73 and the switch box 74, are at that time, in their depressed position, which insures that when the machine is stopped in this manner, it will not be at an intermediate point in its cycle of operation. I thus provide that the cycle of operation of the machine may be completed rapidly and that the machine may operate continuously as long as blanks are supplied to the stack of blanks, and unless the action of the machine is interfered with, for example by a defective blank, in which case, stopping the machine as referred to, insures that all of the parts of the machine are in positions releasing the blanks so that they may be examined and a defective blank or blanks may be taken out of the machine, and insures that the nozzle 114 is closed.

While I have shown my invention in the particular embodiment above described, it will be understood that I do not limit myself to this exact construction as I may employ equivalents known to the art at the time of the filing of this application without departing from the scope of the appended claims.

What I claim is:

1. In a machine for applying sealing compound to can blanks, the combination of members for holding blanks in a stack, a rotatable chuck for receiving a blank from said stack, an ejector bar for removing a blank from said chuck, a pressure bar adjacent said ejector bar and tending to move towards said chuck, nozzle mechanism supported adjacent the edge portion of said chuck and movable laterally to maintain alignment between said nozzle mechanism and the edge portion of a blank on said chuck, a spindle supporting said chuck, cam mechanism for effecting said lateral movement of said nozzle mechanism, gearing between said spindle and said cam mechanism, a main cam shaft, a driving shaft, second gearing between said driving shaft, said main cam shaft and said spindle to drive said spindle more rapidly than said main cam shaft, friction members connecting said second gearing with said spindle, ejector bar actuating devices, nozzle lifting devices, spindle stopping devices, a blank feeding member, blank lifting devices, and cams on said main cam shaft controlling the operation of all of said devices and said feeding member.

2. In a machine for applying sealing compound to can blanks, the combination of members for holding blanks in a stack, a rotatable chuck for receiving a blank from said stack, an ejector bar for removing a blank from said chuck, a pressure bar adjacent said ejector bar and tending to move towards said chuck, nozzle mechanism supported adjacent the edge portion of said chuck and movable laterally to maintain alignment between said nozzle mechanism and the edge portion of a blank on said chuck, a spindle supporting said chuck, cam mechanism for effecting said lateral movement of said nozzle mechanism, gearing between said spindle and said cam mechanism, a main cam shaft, a driving shaft, second gearing between said driving shaft, said main cam shaft and said spindle to drive said spindle more rapidly than said main cam shaft, friction members connecting said second gearing with said spindle, ejector bar actuating devices, nozzle lifting devices, spindle stopping devices, a blank feeding member, blank lifting devices, cams on said main cam shaft controlling the operation of all of said devices and said feeding member, an electric switch bodily movable to operative and inoperative positions, and a switch cam on said main cam shaft for operating said switch for the operative position of the latter.

3. In a machine for applying sealing compound to can blanks, the combination of members for holding blanks in a stack, a rotatable chuck for receiving a blank from said stack, an ejector bar for removing a blank from said chuck, a pressure bar adjacent said ejector bar and tending to move towards said chuck, nozzle mechanism supported adjacent the edge portion of said chuck and movable laterally to maintain alignment between said nozzle mechanism and the edge portion of a blank on said chuck, a spindle supporting said chuck, cam mechanism for effecting said lateral movement of said nozzle mechanism, gearing between said spindle and said cam mechanism, a main cam shaft, a driving shaft, second gearing between said driving shaft, said main cam shaft and said spindle to drive said spindle more rapidly than said main cam shaft, friction members connecting said second gearing with said spindle, ejector bar actuating devices, nozzle lifting devices, spindle stopping devices, a blank feeding member, blank lifting devices, and cams on said main cam shaft controlling the operation of all of said devices and said feeding member, said blank lifting devices comprising tooth members for engaging said stack of blanks just above the lowermost blank of said stack and lifting the engaged and upper blanks away from said lowermost blank.

4. In a machine for applying sealing compound to can blanks, the combination of members for holding blanks in a stack, a rotatable chuck for receiving a blank from said stack, an ejector bar for removing a blank from said chuck, a pressure bar adjacent said ejector bar and tending to move towards said chuck, nozzle mechanism supported adjacent the edge portion of said chuck and movable laterally to maintain alignment between said nozzle mechanism and the edge portion of a blank on said chuck, a spindle supporting said chuck, cam mechanism for effecting said lateral movement of said nozzle mechanism, gearing between said spindle and said cam mechanism, a main cam shaft, a driving shaft, second gearing between said driving shaft, said main cam shaft and said spindle to drive said spindle more rapidly than said main cam shaft, friction members connecting said second gearing with said spindle, ejector bar actuating devices, nozzle lifting devices, spindle stopping devices, a blank feeding member, blank lifting devices, cams on said main cam shaft controlling the operation of all of said devices and said feeding member, and a valve rod having fixed support vertically and closing said nozzle for its lifted position.

5. In a machine for applying sealing compound to can blanks, the combination of a rotatable chuck for supporting a blank, an ejector bar having upper and lower positions to receive and support a blank above said chuck for the upper position of said bar, and a pressure bar adjacent said ejector bar for the upper position of the latter and tending to move towards said chuck, whereby during movement of said ejector bar from its upper to its lower position with a blank between it and said pressure bar, said pressure bar presses said blank into engagement with said chuck.

6. In a machine for applying sealing compound to can blanks, the combination of a rotatable chuck for supporting a blank, an ejector bar having upper and lower positions to receive and support a blank above said chuck for the upper position of said bar, a pressure bar adjacent said ejector bar for the upper position of the latter and tending to move towards said chuck, whereby during movement of said ejector bar from its upper to its lower position with a blank between it and said pressure bar, said pressure bar presses said blank into engagement with said chuck, and means for feeding a blank between said ejector bar and said pressure bar and over said chuck when said ejector bar is in its upper position.

7. In a machine for applying sealing compound to can blanks, the combination of a rotatable chuck for supporting a blank, an ejector bar having upper and lower positions, a pressure bar adjacent said ejector bar for the upper position of the latter and tending to move towards said chuck, whereby during movement of said ejector bar from its upper to its lower position with a blank between it and said pressure bar, said pressure bar presses said blank into engagement with said chuck, a spindle supporting said chuck, a driving shaft, gearing driven by said driving shaft for driving said spindle, friction members between said gearing and said spindle, stopping devices for said spindle, means for feeding a blank between said ejector bar and said pressure bar and over said chuck when said ejector bar is in its upper position, and cam mechanism operated by said driving shaft and controlling said ejector bar, said stopping devices and said feeding means in timed relation effecting operation of said ejector bar and said feeding means with said spindle at rest and effecting rotation of said spindle with said feeding means retracted and said ejector bar in its lower position.

8. In a machine for applying sealing compound to can blanks, the combination of a rotatable chuck for supporting a can blank, movable nozzle mechanism adjacent the edge portion of said chuck, first cam mechanism for moving said nozzle mechanism laterally to maintain alignment with the edge portion of a blank on said chuck, said nozzle mechanism comprising a supporting plate having a vertical bearing on which it is movable laterally, a standard carried by said plate and provided with a vertical guiding portion, a sealing compound container movable vertically on said guiding portion, a nozzle carried by the lower end of said container, and second cam mechanism connected with said container and moving said container and nozzle upwardly away from said chuck and downwardly towards said chuck between sealing compound applying operations.

9. In a machine for applying sealing compound to can blanks, the combination of a rotatable chuck for supporting a can blank, movable nozzle mechanism adjacent the edge portion of said chuck, first cam mechanism for moving said nozzle mechanism laterally to maintain alignment with the edge portion of a blank on said chuck, said nozzle mechanism comprising a supporting plate having a vertical bearing on which it is movable laterally, a standard carried by said plate and provided with a vertical guiding portion, a sealing compound container movable vertically on said guiding portion, a nozzle carried by the lower end of said container, second cam mechanism connected with said container and moving said container and nozzle upwardly away from said chuck and downwardly towards said chuck between sealing compound applying operations, a first rod actuated by said second cam mechanism, a first lever carried by said supporting plate and operated by said first rod, a second rod carried by said standard and operated by said first lever, and a second lever carried by said standard and engaging said container and operated by said second rod.

10. In a machine for applying sealing compound to can blanks, the combination of a rotatable chuck for supporting a can blank, movable nozzle mechanism adjacent the edge portion of said chuck, first cam mechanism for moving said nozzle mechanism laterally to maintain alignment with the edge portion of a blank on said chuck, said nozzle mechanism comprising a supporting plate having a vertical bearing on which it is movable laterally, a standard carried by said plate and provided with a vertical guiding portion, a sealing compound container movable vertically on said guiding portion, a nozzle carried by the lower end of said container, second cam mechanism connected with said container and moving said container and nozzle upwardly away from said chuck and downwardly towards said chuck between sealing compound applying operations, a first rod actuated by said second cam mechanism, a first lever carried by said supporting plate and operated by said first rod, a second rod carried by said standard and operated by said first lever, and a second lever carried by said standard and engaging said container and operated by said second rod, said first rod extending through the vertical bearing of said supporting plate.

11. In a machine for applying sealing compound to can blanks, the combination of a rotatable chuck for supporting a can blank, movable nozzle mechanism adjacent the edge portion of said chuck, first cam mechanism for moving said nozzle mechanism laterally to maintain alignment with the edge portion of a blank on said chuck, said nozzle mechanism comprising a supporting plate having a vertical bearing on which it is movable laterally, a standard carried by said plate and provided with a vertical guiding portion, a sealing compound container movable vertically on said guiding portion, a nozzle carried by the lower end of said container, second cam mechanism connected with said container and moving said container and nozzle upwardly away from said chuck and downwardly towards said chuck between sealing compound applying operations, and a valve rod carried by said standard and extending into said container and closing said nozzle for the upper position of said nozzle.

12. In a machine for applying sealing compound to can blanks, the combination of a rotatable chuck for supporting a can blank, movable nozzle mechanism adjacent the edge portion of said chuck, first cam mechanism for moving said nozzle mechanism laterally to maintain alignment with the edge portion of a blank on said chuck, said nozzle mechanism comprising a supporting plate having a vertical bearing on which it is movable laterally, a standard carried by said plate and provided with a vertical guiding portion, a sealing compound container movable vertically on said guiding portion, a nozzle carried by the lower end of said container, second cam mechanism connected with said container and moving said container and nozzle upwardly away from said chuck and downwardly towards said chuck between sealing compound applying operations, a valve rod carried by said standard and extending into said container and closing said nozzle for the upper position of said nozzle, and a flexible diaphragm fitting tightly around said valve rod and tightly closing the upper end of said container.

13. In a machine for applying sealing compound to can blanks, the combination of a rotatable chuck for supporting a can blank, movable nozzle mechanism adjacent the edge portion of said chuck, first cam mechanism for moving said nozzle mechanism laterally to maintain alignment with the edge portion of a blank on said chuck, said nozzle mechanism comprising a supporting plate having a vertical bearing on which it is movable laterally, a standard carried by said plate and provided with a vertical guiding portion, a sealing compound container movable vertically on said guiding portion, a nozzle carried by the lower end of said container, second cam mechanism connected with said container and moving said container and nozzle upwardly away from said chuck and downwardly towards said chuck between sealing compound applying operations, a second plate carried by said supporting plate and movable relatively to said supporting plate, a roller carried by said second plate for engaging said first cam mechanism, and devices for holding said plates together against relative movement.

14. In a machine of the class described, the combination of a chuck spindle having one rotation per cycle of operation of the machine comprising feeding a blank to compound applying position, applying sealing compound to said blank, and removing the blank from said position, a cam shaft having one rotation per cycle of operation of the machine, gearing connecting said spindle and said shaft and having a ratio effecting more rapid rotation of said spindle than said shaft, friction members connected with said gearing, and stopping devices limiting each movement of said spindle to one rotation, whereby said spindle completes each cycle of its movement before said cam shaft completes its corresponding cycle of movement and said spindle is at rest during the completion of the corresponding cycle of movement of said cam shaft.

15. In a machine of the class described, the combination of a chuck spindle having one rotation per cycle of operation of the machine comprising feeding a blank to compound applying position, applying sealing compound to said blank, and removing the blank from said position, a cam shaft having one rotation per cycle of operation of the machine, gearing connecting said spindle and said shaft and having a ratio effecting more rapid rotation of said spindle than said shaft, friction members connected with said gearing stopping devices limiting each movement of said spindle to one rotation, whereby said spindle completes each cycle of its movement before said cam shaft completes its corresponding cycle of movement and said spindle is at rest during the completion of the corresponding cycle of movement of said cam shaft, and a driving shaft connected with said gearing, said gearing comprising a worm carried by said driving shaft and two worm wheels carried respectively by said cam shaft and said spindle and meshing with said worm, said cam shaft worm wheel being of larger diameter than said spindle worm wheel.

16. In a machine of the class described, the combination of nozzle mechanism having open and closed conditions, cam mechanism for controlling said nozzle mechanism, an electric switch controlling operation of the machine, a switch cam for actuating said switch when said nozzle mechanism is in closed condition, and a frame supporting said switch for movement towards and from said switch cam, whereby said switch cam operates said switch only when said switch is moved by said frame towards said switch cam and only when said nozzle mechanism is in its closed condition.

17. In a machine of the class described, the combination of a rotary chuck having a vertical axis, a nozzle above said chuck and movable vertically towards and from said chuck, and a vertically stationary valve rod extending upwardly from said nozzle and adapted at its lower end for closing engagement with said nozzle, whereby said nozzle is closed by upward movement of said nozzle.

18. In a machine of the class described, the combination of a rotary chuck having a vertical axis, a nozzle above said chuck and movable vertically towards and from said chuck, a vertically stationary valve rod extending upwardly from said nozzle and adapted at its lower end for closing engagement with said nozzle, whereby said nozzle is closed by upward movement of said nozzle, a first cam controlling rotation of said chuck and providing alternate periods of movement and rest therefor, and a second cam controlling vertical movement of said nozzle and holding said nozzle in its upper and closed position for rest periods of said chuck.

19. In a machine of the class described, the combination of a rotary chuck having a vertical axis, a nozzle above said chuck and movable vertically towards and from said chuck, a vertically stationary valve rod extending upwardly from said nozzle and adapted at its lower end for closing engagement with said nozzle, whereby said nozzle is closed by upward movement of said nozzle, a laterally movable support for said nozzle and said valve rod, and a cam controlling lateral movement of said support to maintain alignment between said nozzle and the edge portion of a blank carried by said chuck.

20. In a machine of the class described, the combination of a rotary chuck having a vertical axis, a nozzle above said chuck and movable vertically towards and from said chuck, a vertically stationary valve rod extending upwardly from said nozzle and adapted at its lower end for closing engagement with said nozzle, whereby said nozzle is closed by upward movement of said nozzle, a first cam controlling rotation of said chuck and providing alternate periods of movement and rest therefor, a second cam controlling vertical movement of said nozzle and holding said nozzle in its upper and closed position for rest periods of said chuck, a laterally movable support for said nozzle and said valve rod, and a third cam controlling lateral movement of said support to maintain alignment between said nozzle and the edge portion of a blank carried by said chuck.

21. In a machine of the class described, the combination of a rotary chuck having a vertical axis, a nozzle above said chuck and movable vertically towards and from said chuck, a vertically stationary valve rod extending upwardly from said nozzle and adapted at its lower end for closing engagement with said nozzle, whereby said nozzle is closed by upward movement of said nozzle, and blank-handling means for removing a blank from said chuck and supplying another blank to said chuck when said nozzle is in its upper position.

22. In a machine of the class described, the combination of a rotary chuck having a vertical axis, a nozzle above said chuck and movable vertically towards and from said chuck, a vertically stationary valve rod extending upwardly from said nozzle and adapted at its lower end for closing engagement with said nozzle, whereby said nozzle is closed by upward movement of said nozzle, a first cam controlling rotation of said chuck and providing alternate periods of movement and rest therefor, a second cam controlling vertical movement of said nozzle and holding said nozzle in its upper and closed position for rest periods of said chuck, and blank-handling means for removing a blank from said chuck and supplying another blank to said chuck during each of said rest periods.

23. In a machine of the class described, the combination of a rotary chuck having a vertical axis, a nozzle above said chuck and movable vertically towards and from said chuck, a vertically stationary valve rod extending upwardly from said nozzle and adapted at its lower end for closing engagement with said nozzle, whereby said nozzle is closed by upward movement of said nozzle, a laterally movable support for said nozzle and said valve rod, a cam controlling lateral movement of said support to maintain alignment between said nozzle and the edge portion of a blank carried by said chuck, and blank-handling means for removing a blank from said chuck and supplying another blank to said chuck when said nozzle is in its upper position.

24. In a machine of the class described, the combination of a rotary chuck having a vertical axis, a nozzle above said chuck and movable vertically towards and from said chuck, a vertically stationary valve rod extending upwardly from said nozzle and adapted at its lower end for closing engagement with said nozzle, whereby said nozzle is closed by upward movement of said nozzle, a first cam controlling rotation of said chuck and providing alternate periods of movement and rest therefor, a second cam controlling vertical movement of said nozzle and holding said nozzle in its upper and closed position for rest periods of said chuck, a laterally movable support for said nozzle and said valve rod, a third cam controlling lateral movement of said support to maintain alignment between said nozzle and the edge portion of a blank carried by said chuck, and blank-handling means for removing a blank from said chuck and supplying another blank to said chuck during each of said rest periods.

CHARLES STECHER.